(12) United States Patent
Ruhlig et al.

(10) Patent No.: US 9,790,615 B2
(45) Date of Patent: Oct. 17, 2017

(54) IDENTIFYING AND REGULATING THE STARTING BEHAVIOR DURING ELECTROCHEMICAL MACHINING OF WORKPIECES

(71) Applicant: MTU Aero Engines AG, Munich (DE)

(72) Inventors: Dirk Ruhlig, Dorfen (DE); Markus Boxhammer, Munich (DE)

(73) Assignee: MTU AERO ENGINES AG, Munich (DE)

( * ) Notice: Subject to any disclaimer, the term of this patent is extended or adjusted under 35 U.S.C. 154(b) by 301 days.

(21) Appl. No.: 14/518,007

(22) Filed: Oct. 20, 2014

(65) Prior Publication Data

US 2015/0114844 A1 Apr. 30, 2015

(30) Foreign Application Priority Data

Oct. 30, 2013 (DE) .................. 10 2013 222 083

(51) Int. Cl.
| | |
|---|---|
| *B23H 3/02* | (2006.01) |
| *C25F 7/00* | (2006.01) |
| *C25F 3/02* | (2006.01) |
| *B23H 7/20* | (2006.01) |

(52) U.S. Cl.
CPC ............ *C25F 7/00* (2013.01); *B23H 3/02* (2013.01); *B23H 7/20* (2013.01); *C25F 3/02* (2013.01); *B23H 2300/10* (2013.01)

(58) Field of Classification Search
CPC .................................... B23H 3/02; C25F 7/00
USPC ................................................. 205/642, 644
See application file for complete search history.

(56) References Cited

U.S. PATENT DOCUMENTS

| | | | |
|---|---|---|---|
| 6,213,843 B1* | 4/2001 | Kramer | B23H 5/04 451/21 |
| 6,620,307 B2 | 9/2003 | Zaitsev et al. | |
| 7,581,434 B1* | 9/2009 | Discenzo | G01N 33/2888 73/53.01 |
| 7,727,375 B2 | 6/2010 | Zajcev et al. | |
| 2002/0169516 A1 | 11/2002 | Brussee et al. | |
| 2003/0010650 A1 | 1/2003 | Zaitsev et al. | |
| 2005/0178671 A1 | 8/2005 | Zajcev et al. | |

FOREIGN PATENT DOCUMENTS

| | | |
|---|---|---|
| DE | 102006027033 A1 | 12/2007 |
| WO | 03099498 A1 | 12/2003 |
| WO | 03099499 A1 | 12/2003 |

OTHER PUBLICATIONS

Nastasi, Safronov: Power Supplies, Control Systems and Protective Devices for Electrochemical Diesinking Machines. In Machines & Tooling, 1977, H. 9, S. 40-43.

* cited by examiner

Primary Examiner — Nicholas A Smith
(74) Attorney, Agent, or Firm — Abel Law Group, LLP (57) ABSTRACT

Disclosed is a method for the electrochemical machining of a workpiece, in which at least one electrode is situated adjacent to a surface to be machined and current pulses are generated in pulsed operation to ablate material from the workpiece. Before and/or at the beginning and/or during the electrochemical ablation, data of the current pulses are registered and analyzed to identify a starting phase or a transient phase comparable to a starting phase and/or to regulate the spacing of the electrode to the surface to be machined and/or the current flow during a starting phase or a transient phase comparable to a starting phase.

17 Claims, 7 Drawing Sheets

IDENTIFYING AND REGULATING THE STARTING BEHAVIOR DURING ELECTROCHEMICAL MACHINING OF WORKPIECES

CROSS-REFERENCE TO RELATED APPLICATIONS

The present application claims priority under 35 U.S.C. §119 of German Patent Application No. 102013222083.9, filed Oct. 30, 2013, the entire disclosure of which is expressly incorporated by reference herein.

BACKGROUND OF THE INVENTION

1. Field of the Invention

The present invention relates to a method for electrochemical machining of workpieces.

2. Discussion of Background Information

Electrochemical machining (ECM) is a shaping machining method for machining workpieces, which can be advantageously used both in the production of complex surface shapes and/or materials which are difficult to machine. The method makes use of the anodic oxidation of the material to be machined, wherein a working electrode is arranged with spacing to the surface to be machined and an electrolyte is provided in the gap between the surface to be machined and the electrode, so that by applying an electrical potential between electrode and workpiece to be machined, the material of the workpiece is dissolved by anodic oxidation and passes into the electrolyte. A material ablation thus results, which is dependent on the potential ratios in the machining gap. These are in turn influenced by the gap width, so that a three-dimensional shape of the working electrode correspondingly having different spacings of the working electrode to the surface to be machined results in a shape-dependent ablation. The shape of the working electrode may therefore be embossed or imaged in the machined surface.

The electrochemical ablation can be carried out not only continuously, but rather also in pulsed form, wherein a continuous current flow is not set, but rather a plurality of current pulses are executed in succession. Such a method is also referred to as PECM (pulsed electrochemical machining).

During the machining of workpieces made of specific materials, for example, workpieces made of titanium aluminides, so-called starting behavior occurs during the electrochemical machining, which is characterized in that during the initial time of the ablation process, the potential and current values measured over the machining gap change. This can have the result that the machining parameters for the electrochemical machining are set incorrectly. For example, an incorrect setting of the gap width, i.e., of the spacing between the surface to be machined and the electrode surface could thus result, which could lead to poor machining results due to the corresponding effects on the potential distribution in the working gap and therefore on the ablation behavior of the material.

Accordingly, methods were already described in WO 03/099498 A1 and WO 03/099499 A1, the entire disclosures of which are incorporated by reference herein, of how the actual gap width between working electrode and surface to be machined can be determined to achieve the correct setting of the gap width. However, these documents are not concerned with the question of how a corresponding starting phase can be recognized during the electrochemical machining and which measures can be taken to achieve optimum electrochemical machining in the case of a starting phase or a comparable transient phase, to ensure optimum electrochemical machining.

It would therefore be advantageous to be able to provide a method for electrochemical machining of workpieces, in which the presence of a starting phase during the electrochemical machining or of a transient phase of the machining process comparable to a starting phase can be recognized and in which optimum electrochemical machining can also be implemented during a starting phase or a comparable transient phase. The corresponding method is to be able to be carried out simply and reliably at the same time, however.

SUMMARY OF THE INVENTION

The present invention provides a method for the electrochemical machining of a workpiece, wherein at least one electrode is situated adjacent to a surface to be machined and current pulses are generated in pulsed operation to ablate material from the workpiece. Before and/or at the beginning and/or during an electrochemical ablation, data of the current pulses are registered and analyzed to identify a starting phase or a transient phase comparable to a starting phase and/or to regulate a spacing of the electrode to the surface to be machined and/or a current flow during the starting phase or the transient phase comparable to a starting phase.

In one aspect of the method, the starting phase or the transient phase comparable to a starting phase may be identified in that an ablation rate is not constant.

In another aspect, the starting phase or the transient phase comparable to a starting phase may be identified in that a maximum or average current strength per pulse rises over a series of successive pulses or the maximum or average voltage per pulse drops over a series of successive pulses.

In yet another aspect, the current strength of a current pulse may be ascertained at a predetermined point in time of the current pulse. For example, the current strength of a current pulse may be ascertained in a time interval in the middle of the current pulse and/or the current strength of each current pulse may be ascertained.

In a still further aspect of the method of the present invention, material-specific and/or system-specific parameters may be ascertained from registered data of the current pulses. For example, the material-specific and/or system-specific parameters may comprise at least one of the overall electrical resistance of the system, the overvoltage, or the conductivity.

In another aspect, the spacing of the electrode to the surface to be machined and/or of the current flow may be regulated by setting the feed of the electrode in a direction of the surface to be machined and/or by setting the applied potential as manipulated variables. For example, the regulation may comprise a linearization and decoupling of the manipulated variables, the applied potential U being defined by $$U = v_2\left(R + \frac{x}{\kappa A}\right) + \Delta U,$$

and/or the feed V being defined by $$V = \kappa v_2 - v_1,$$

wherein R is a total resistance of a system, x is the spacing of the electrode from the surface to be machined, $\kappa$ represents electrical conductivity, A represents a working surface area of the electrode, $\Delta U$ represents an overvoltage, and $v_1$ and $v_2$ are virtual manipulated variables, $v_1$ corresponding to a control variable of the spacing of the electrode from the surface to be machined and $v_2$ corresponding to a control variable of a current strength.

In another aspect of the method, the regulation may use a PI regulator and/or a Kalman filter.

The present invention proposes, for identifying a starting phase or a transient phase comparable to a starting phase, registering and analyzing data of the current pulses before and/or at the beginning and/or during the electrochemical ablation and/or regulating the spacing of the electrode to the surface to be machined and/or the current flow during a starting phase or a transient phase comparable to a starting phase.

It can be ensured by the identification of a starting phase or of a transient phase comparable to a starting phase that the parameters of the electrochemical machining can be adapted appropriately, to implement optimum electrochemical machining at all times as much as possible. Achieving or re-achieving a steady phase can be accelerated by regulating the electrode spacing to the surface to be machined and/or the current flow during the starting phase or during a transient phase comparable to a starting phase, since the most extensive possible consistency of the machining process can be achieved by the regulation of the electrochemical process.

Any phase of the electrochemical ablation, in which the ablation rate is not constant, can be identified as a starting phase or as a transient phase comparable to a starting phase. In particular, during such a starting phase or transient phase, the maximum or average current strength per pulse can change, in particular rise, over a series of successive pulses, or the maximum average voltage per pulse, which drops over the gap, can decrease during a series of successive pulses. Accordingly, corresponding measured values can be recorded, stored, and analyzed to identify a starting phase or a comparable transient phase.

One possibility is to ascertain the current strength of a current pulse, in particular each current pulse. The current value of a current pulse can be ascertained at a predetermined point in time of the current pulse, for example, in a time interval in the middle of the current pulse.

The registered data of the current pulses, such as the current strengths of the current pulses in particular, can be used to ascertain material-specific and/or system-specific parameters of the machining process, for example, to ascertain the overall electrical resistance of the system without the gap resistance and the interface resistance between electrolyte and electrode and/or to ascertain the overvoltage required for dissolving material and/or to ascertain the conductivity of the electrolyte in the specific application of a machining gap of an electrochemical machining machine. By ascertaining the material-specific and/or system-specific parameters, which can vary during the starting phases or other comparable transient phases, these parameters can additionally be adapted with the aid of the ascertained data of the current pulses, so that optimum setting of the parameters for electrochemical machining is possible.

At the same time, with the aid of the ascertained material-specific and/or system-specific parameters, regulation of the electrochemical ablation can also be performed during a transient phase or a starting phase, for example, by regulating the spacing of the electrode to the surface to be machined and/or the current flow.

The regulation of the spacing of the electrode to the surface to be machined can be performed by setting the feed of the electrode in the direction of the surface to be machined and the regulation of the current flow can be caused by setting the applied potential. However, these manipulated variables for the regulation can be replaced by virtual manipulated variables in the scope of linearization and decoupling of the manipulated variables, wherein the manipulated variable of the applied potential U results by way of:

$$U=v_2(R+x/\kappa A)+\Delta U,$$

wherein R is the total resistance of the system without the gap resistance and the interface resistance between electrolyte and electrode, x is the spacing of the electrode from the surface to be machined, $\kappa$ is the electrical conductivity, A is the working surface area of the electrode, and $\Delta U$ is the overvoltage. $v_1$ and $v_2$ are virtual manipulated variables, wherein the feed V results as:

$$V=\kappa v_2-v_1.$$

In the regulation, a proportional-integral (PI) regulator and/or a Kalman filter can be used, to minimize errors as much as possible in the measured value ascertainment in the control loop. To obtain a closed control loop, measurement results for the control variables current and gap width are fed back to the regulator, wherein the measurement results are conditioned by the Kalman filter. This is advantageous in particular for the determination of the gap width between electrode and working surface, which can be estimated by an observer. The application of a so-called Kalman filter results here in a minimization of the estimation error. In addition, the Kalman filter can also filter the measured current value for the feedback of the control loop of corresponding measurement errors, to thus achieve a better regulation result.

BRIEF DESCRIPTION OF THE DRAWINGS

In the appended figures, which are solely schematic.

EXEMPLARY EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show details of the present invention in more detail than is necessary for the fundamental understanding of the present invention, the description in combination with the drawing making apparent to those of skill in the art how the several forms of the present invention may be embodied in practice.

Figure 1:
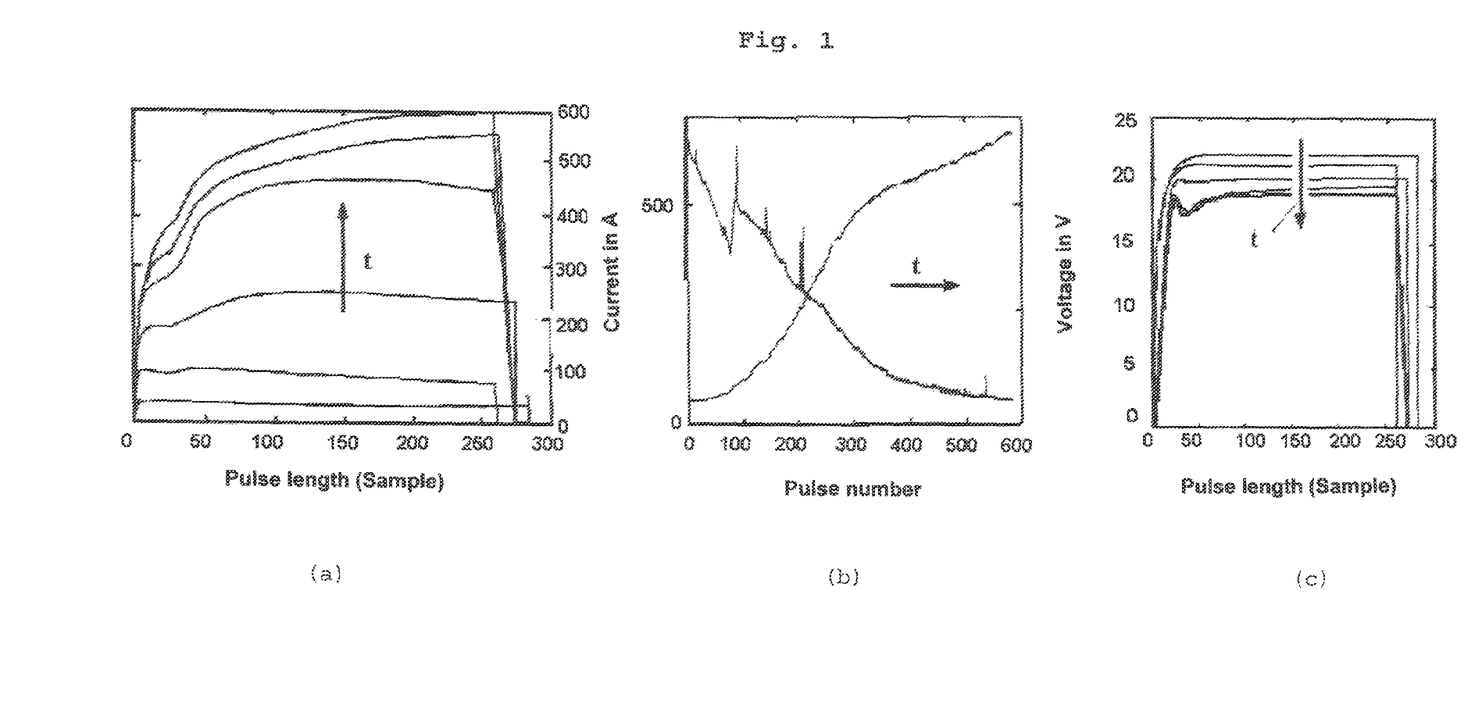
FIG. 1 shows, in partial FIGS. a) to c), a current-time graph a) and a voltage-time graph c) and also an illustration of the change of current and voltage over the number of pulses b)

FIG. 1 shows, in partial FIGS. a) to c), a typical situation of the starting behavior at the process beginning or of a transient behavior of current and voltage during electrochemical machining. In partial FIG. a) of FIG. 1, the current is plotted over the pulse length and various current pulses are shown, which occur with progressing time at the beginning of electrochemical machining. This is illustrated with the arrow and the lowercase letter t, which indicates that the illustrated current pulses have a higher current value with higher pulse number or progressing time. In a similar manner, the voltage over the pulse length and also the voltage curve of a plurality of pulses is illustrated in FIG. 1 c), wherein it can be seen that with increasing machining duration t or higher number of pulses, the maximum voltage drop of the pulses decreases.

FIG. 1 b) illustrates the curve of the voltage and current over the number of pulses. It can be seen in this case that the voltage drops of the pulses decrease with increasing time or higher pulse number, while the maximum or average current per pulse increases with increasing number of the pulses. This tendency is first stopped when a stable state has resulted during the electrochemical machining, in which the ablation rate has reached a constant level.

However, the ablation conditions, which are variable in the starting phase or a comparable transient phase, can result in incorrect setting of ablation parameters, so that a corresponding change of the machining parameters can be performed by the identification of corresponding starting phases or comparable transient conditions.

Figure 2:
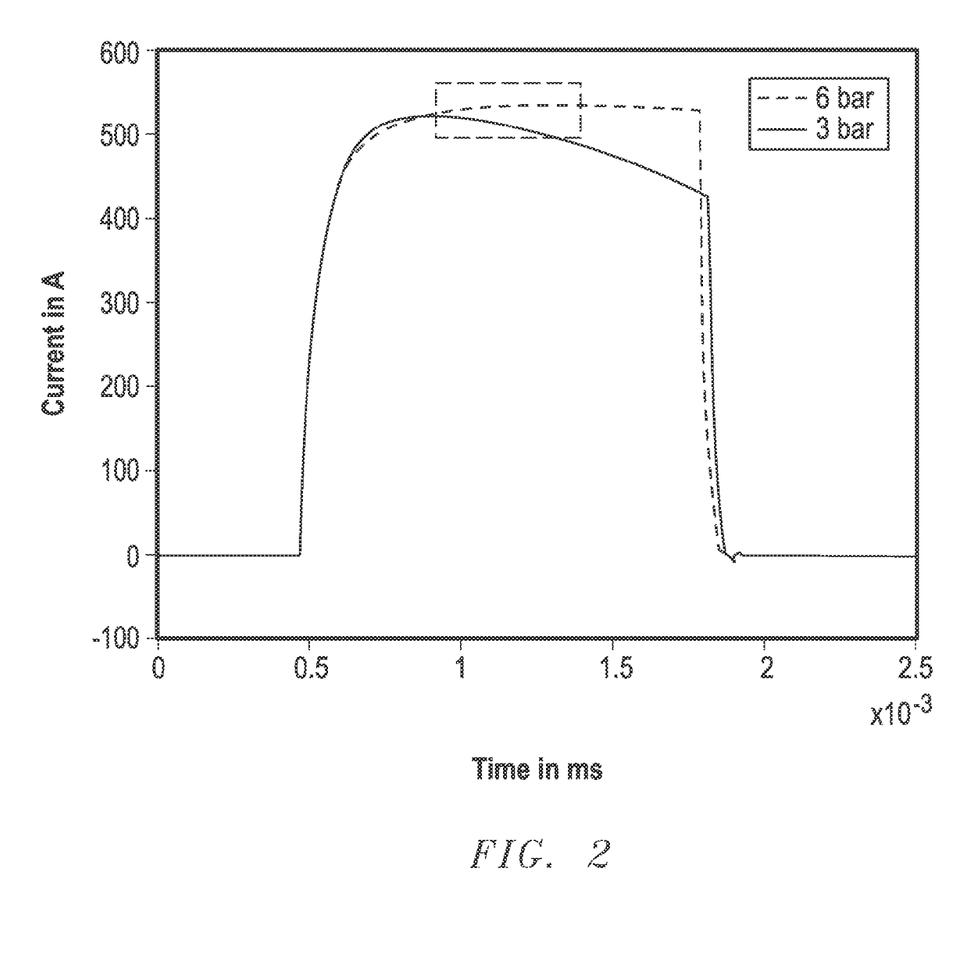
FIG. 2 shows a current-time graph of two current pulses at different pressures (6 bar and 3 bar) and the illustration of the measurement window for the current strength.

To be able to identify transient phases or starting phases according to the illustration of FIG. 1, a current value is ascertained from each current pulse, as shown in FIG. 2. FIG. 2 shows two current pulses in a current-time graph, specifically for different pressure conditions in the electrolyte gap between electrode and surface to be machined. As shown in FIG. 2, a specific measurement window is defined, in which the current value of the current pulse is ascertained. In the present case, the current value is ascertained in a middle time interval of the current pulse.

The current value thus ascertained is used, on the one hand, for the identification of a transient phase or of a starting phase and, on the other hand, corresponding current value measurements are used to determine material-specific and system-specific variables, such as the total resistance of the system, the overvoltage, and the conductivity. The total resistance results in this case from the line resistance and the inductance of the electrical assembly for the electrochemical machining. The additionally occurring resistances with regard to the working gap between electrode and surface to be machined and the electrode-electrolyte interface are not taken into consideration in this case, however.

The overvoltage is a measure of the voltage which must be overcome as a limiting voltage, so that electrochemical ablation begins, while the conductivity is a material-specific variable of the electrolyte used. According to the invention, these parameters are used for the regulation during the starting phase or a comparable transient phase, wherein the corresponding parameters are to be newly determined after reaching a stable state under certain circumstances, since they could have changed after the stable state results.

Figure 3:
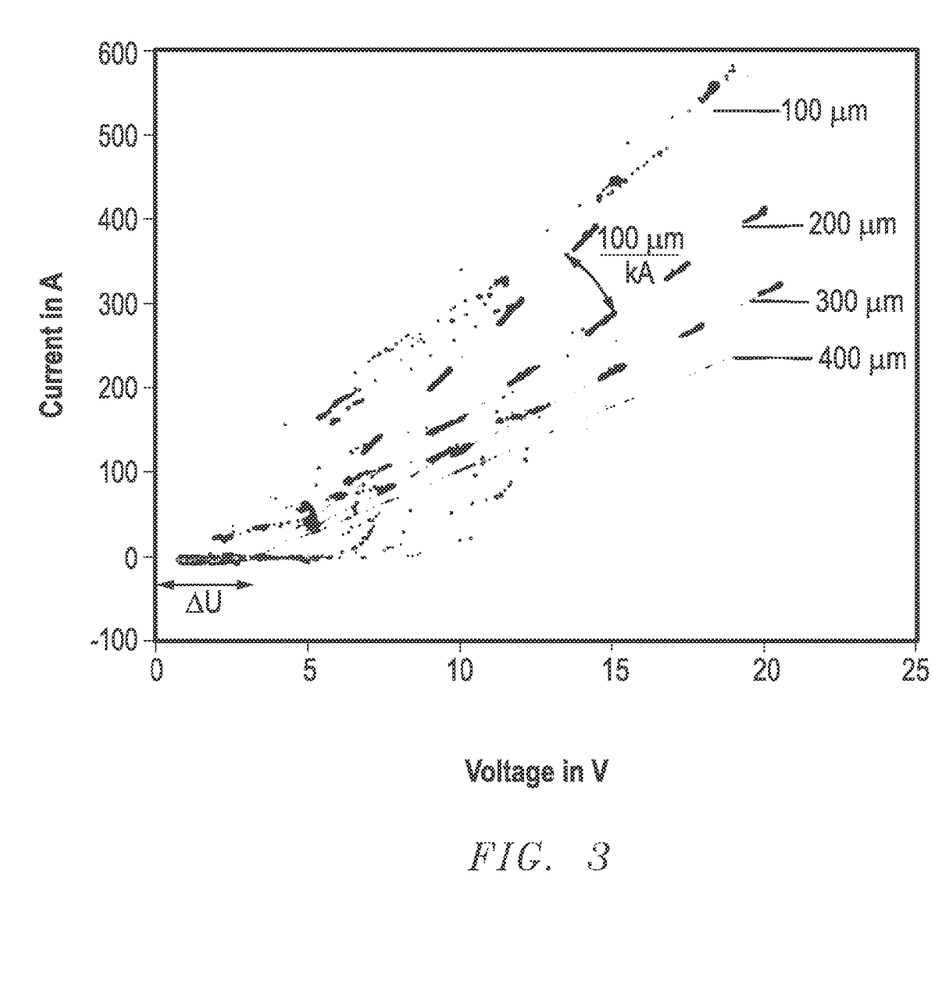
FIG. 3 shows a current-voltage graph for a plurality of current measurements of current pulses according to FIG. 2 with different spacings of the electrode from the surface to be machined and different applied voltages.

The illustration of FIG. 3 shows the plotting of the measured current values of a plurality of current pulses over the voltage, wherein the various current values have been ascertained for various gap thicknesses in the range between 100 µm and 400 µm and at various applied voltages.

The overvoltage ΔU, which is given by the intersection point of the current-voltage curve for each gap width with the abscissa axis, may be determined directly from FIG. 3 from the current values which have been measured for different gap widths at different applied voltages and which are arranged along straight lines.

In addition, the graph of FIG. 3 illustrates that the various ascertained current values of the current pulses can additionally be used for the determination of the further material-specific and system-specific variables, since the different slopes of the current-voltage curves for the different gap widths between electrode and surface to be machined correspond to a quotient of the difference of the gap width and the product of surface area of the working electrode and conductivity, while the slopes of the current-voltage curves correspond to the sum of total resistance of the electrical assembly and the gap resistance and also the interface resistance between electrode and electrolyte. Therefore, the corresponding material-specific and system-specific variables may be determined mathematically from the measured values which are visually represented in FIG. 3. This can be performed in the scope of preliminary experiments before the actual machining, at the beginning of the machining, or during the machining.

Figure 4:
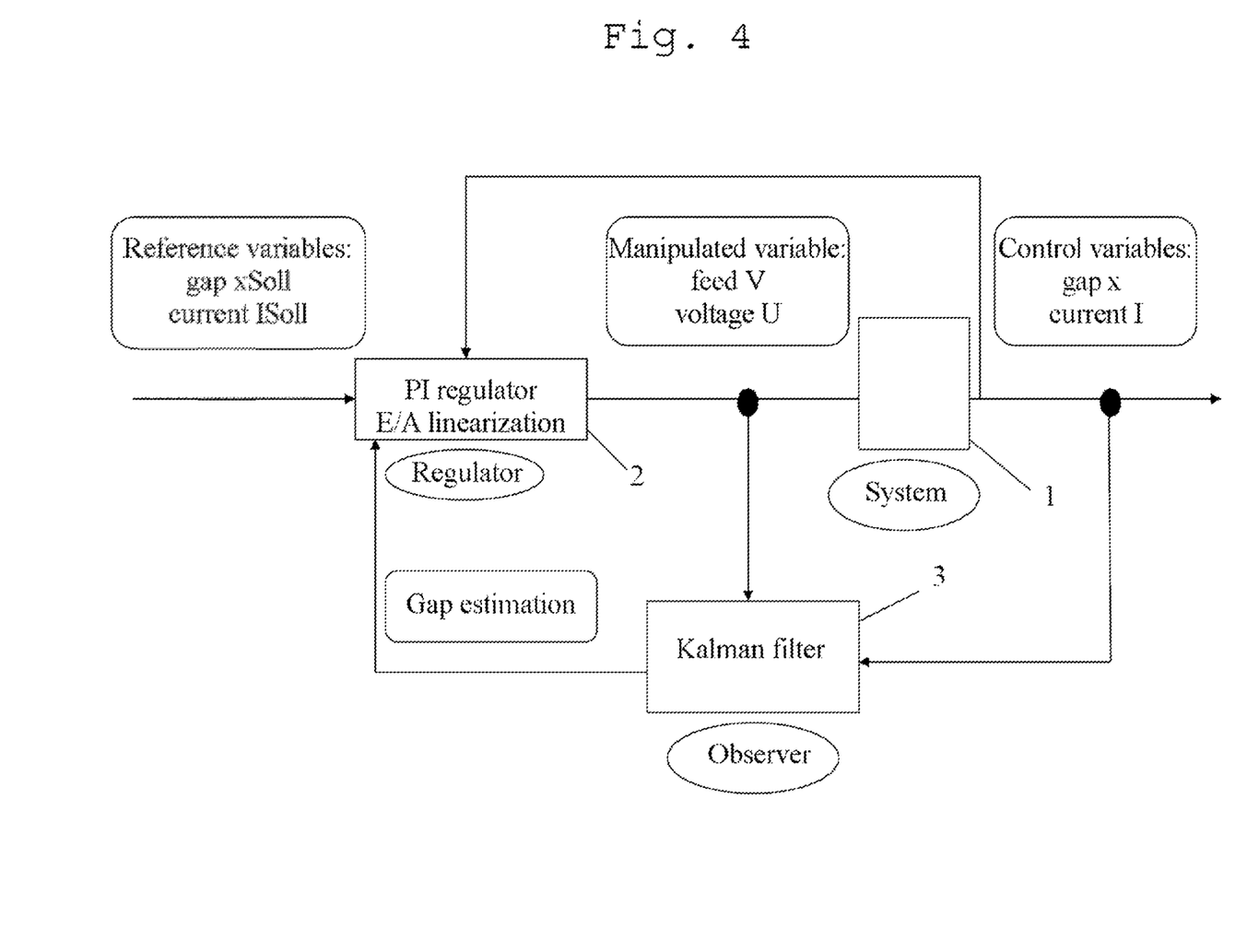
FIG. 4 shows an illustration of the control loop according to the present invention.

FIG. 4 shows the outline of a control loop for electrochemical machining, wherein the machine 1 for electrochemical machining can be referred to in control technology as a system. The gap width, i.e., the spacing of the electrode to the surface to be machined, and the current flow as a measure of the material ablation are to be regulated as control variables. Correspondingly, the desired gap width and the desired current are also set as reference variables on a regulator 2, which is implemented in the present case as a proportional-integral regulator. In addition, a so-called input/output linearization is implemented, which will be discussed in detail hereafter. In the machine 1 for electrochemical machining, the feed V of the electrode in the direction of the surface to be machined and the voltage U applied to the electrode are used as manipulated variables.

Furthermore, a Kalman filter 3 is used, into which the manipulated variables, and also the control variables actually registered by measurement, are input as input variables, to minimize errors occurring during the registration of the actual values of the control variables as much as possible. In addition to the measurement of the actual current value, the gap width is estimated by observation and provided to the regulator 2.

Figure 5:
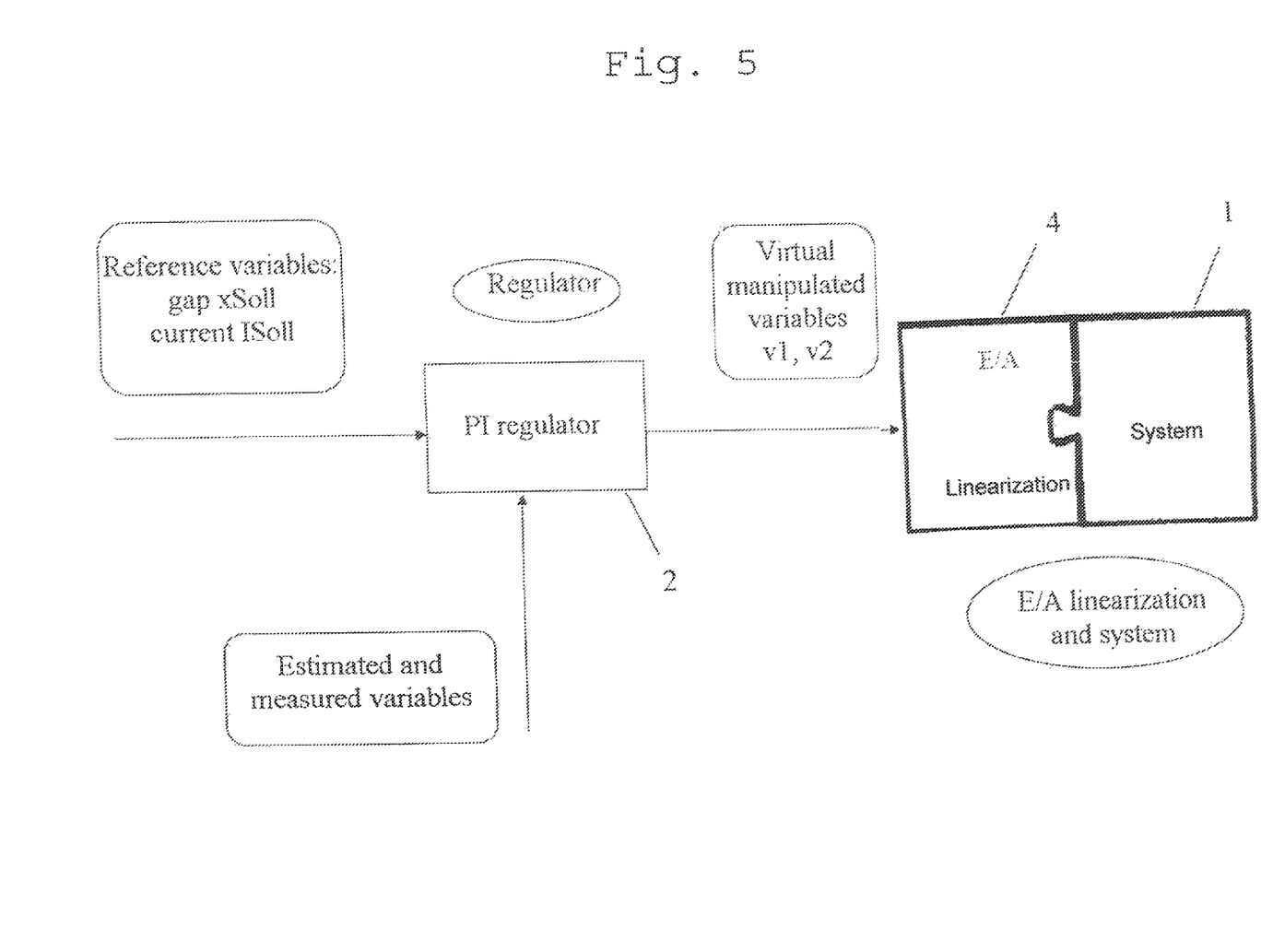
FIG. 5 shows an illustration of the linearization of the manipulated variables implemented during the regulation.

FIG. 5 shows a detail of the cooperation of the PI regulator 2 with the system 1 in cooperation with an input/output linearization 4.

The PI regulator 2, which receives as input variables the estimated and measured variables with respect to the gap width and the current value and also as reference variables the setting of the desired gap width and of the current, only outputs virtual manipulated variables $v_1$, $v_2$, which enable a linearization of a nonlinear system to produce a decoupled, linear system.

Figure 6:
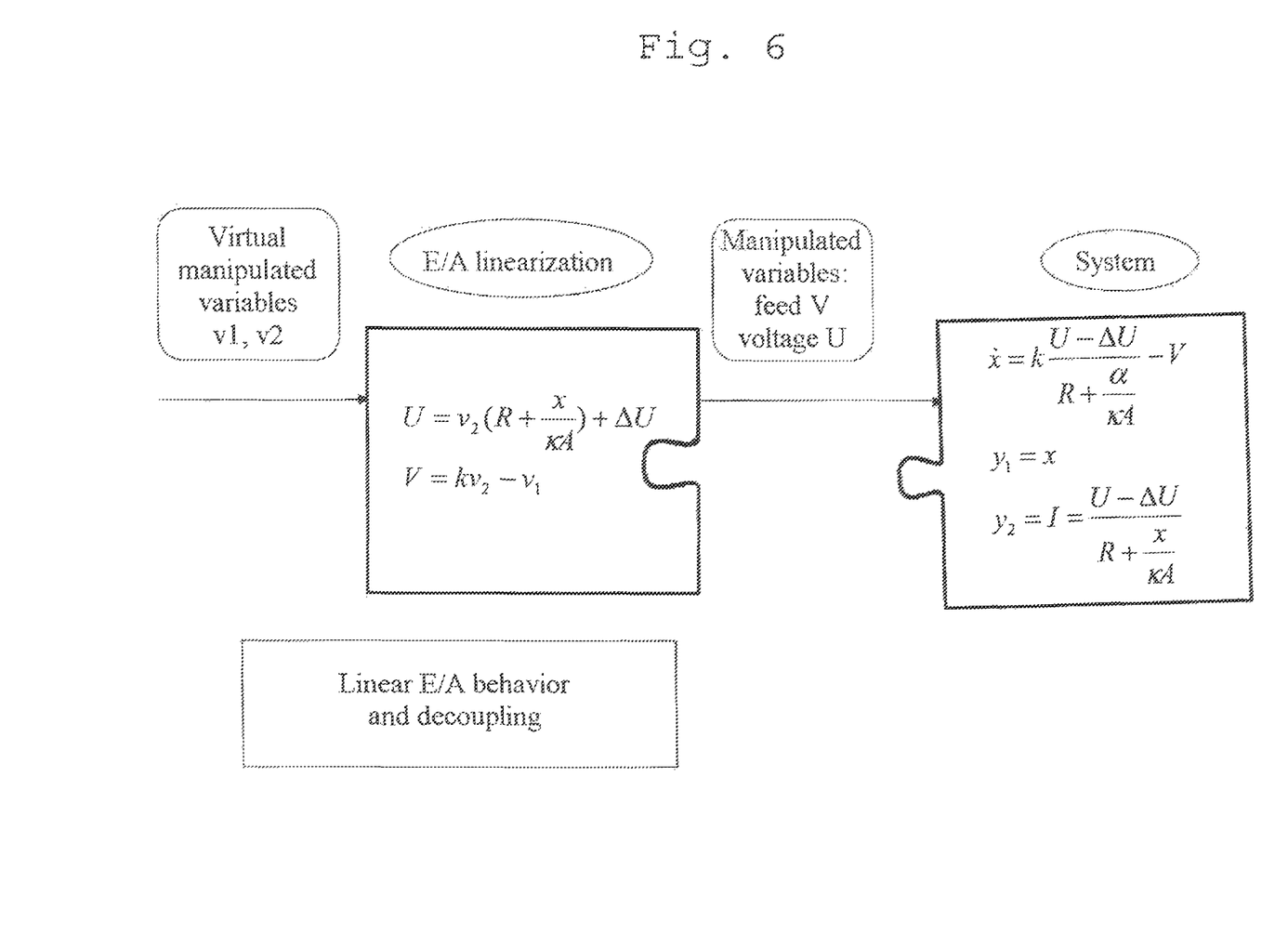
FIG. 6 shows a partial illustration of the linearization and decoupling of the manipulated variables according to the invention.

The linearization is based on the relationships shown in FIG. 6 between the applied potential U and the feed V.

The applied potential results here as:

$$U = v_2\left(R + \frac{x}{\kappa A}\right) + \Delta U,$$

wherein $v_2$ is a virtual manipulated variable, R is the total resistance of the electrochemical system without the resistance due to the processing gap and the electrolyte-electrode interface, x is the gap width, κ is the electrical conductivity, A is the variable of the machining surface area on the electrode, and ΔU is the overvoltage.

The feed V is defined as:

$$V = \kappa v_2 - v_1,$$

wherein $v_1$ is also a virtual manipulated variable.

The real manipulated variables feed V and applied potential U may thus be set in a simple manner, to obtain the control variables $y_1$=gap width x and $y_2$=current strength I in the desired variable.

Therefore, the chronological change of the gap width in the controlled system, i.e., the electrochemical machining machine 1, results as:

$$\dot{x} = \kappa \frac{U - \Delta U}{R + \frac{x}{\kappa A}} - V$$

Figure 7:
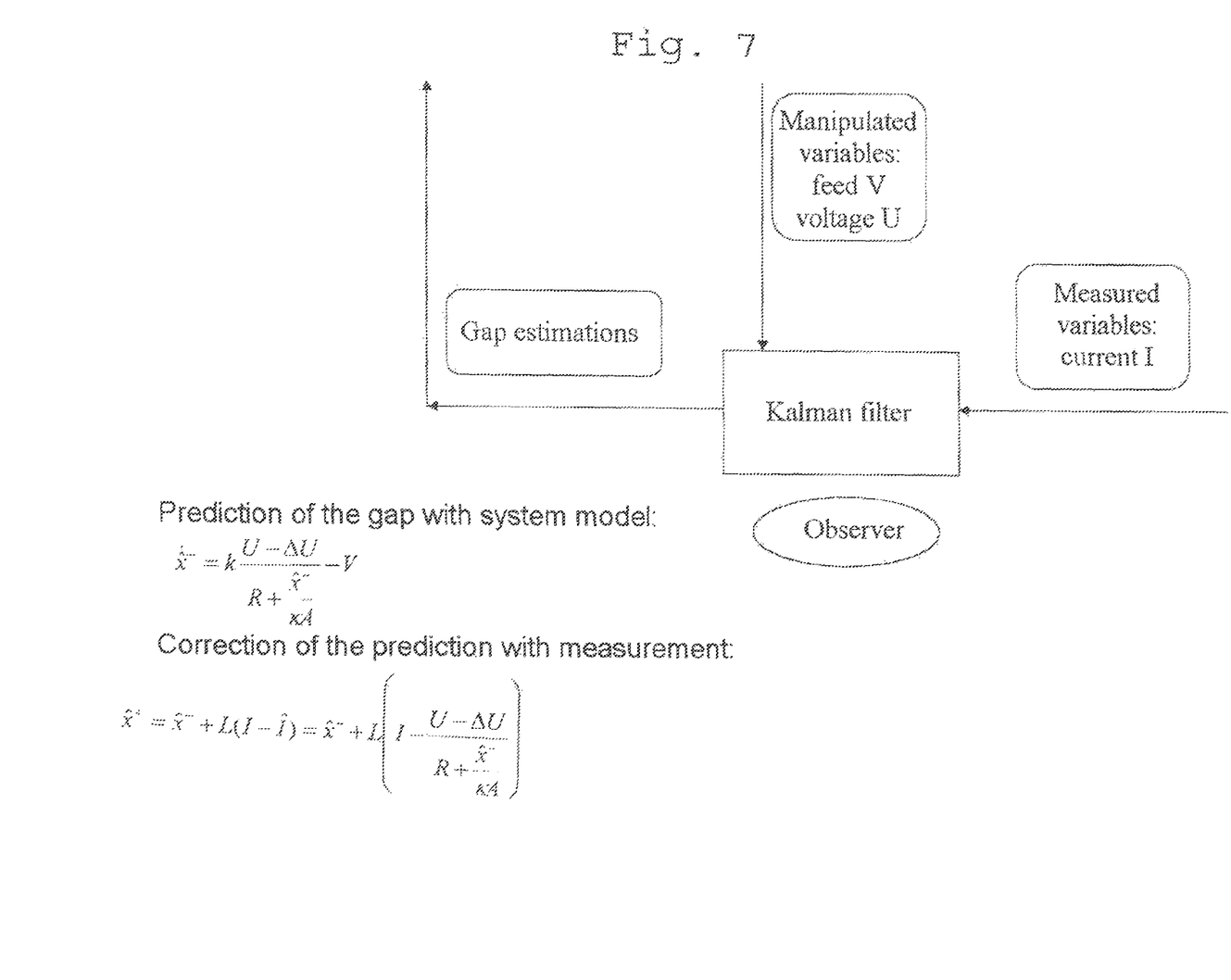
FIG. 7 shows an illustration of the use of the Kalman filter in the control loop.

FIG. 7 shows the mode of operation of the Kalman filter 3 from FIG. 4, which has both the manipulated variables feed V and voltage U, and also the measured current value I as input variables. In addition, the input of the observer with respect to the spacing of the electrode from the working surface area (gap width) is provided, so that values, which are filtered by the Kalman filter, with regard to both the gap estimation and also the measured current, are output to the PI regulator 2.

Therefore, a method results overall, in which, on the one hand, starting phases or transient phases comparable thereto are identifiable and, on the other hand, the capability of regulating the electrochemical machining machine is also provided in a starting phase or a transient phase comparable thereto. In addition, material-specific and system-specific variables can be determined for the operation and the regulation of the electrochemical machining system 1 and adapted accordingly, to ensure optimum electrochemical machining.

Although the present invention has been described in detail on the basis of the exemplary embodiment, it is obvious for a person skilled in the art that the invention is not restricted to this exemplary embodiment, but rather that alterations are possible such that individual features can be omitted or other types of combinations of features can be implemented, without leaving the scope of protection of the appended claims. The disclosure of the present invention also includes all combinations of the presented individual features.

What is claimed is:

1. A method for electrochemical machining of a workpiece, wherein at least one electrode is situated adjacent to a surface to be machined and current pulses are generated in pulsed operation to ablate material from the workpiece, and wherein before and/or at the beginning and/or during an electrochemical ablation, data of the current pulses are registered and analyzed to identify a starting phase or a transient phase comparable to a starting phase and/or to regulate a spacing of the electrode to the surface to be machined and/or a current flow during the starting phase or the transient phase comparable to a starting phase, and wherein the spacing of the electrode to the surface to be machined and/or of the current flow is regulated by setting a feed of the electrode in a direction of the surface to be machined and/or by setting an applied potential as manipulated variables, a regulation comprising a linearization and decoupling of the manipulated variables, the applied potential U being defined by $$U = v_2\left(R + \frac{x}{\kappa A}\right) + \Delta U,$$

and/or the feed V being defined by $$V = \kappa v_2 - v_1,$$

wherein R is a total resistance of a system, x is the spacing of the electrode from the surface to be machined, κ represents electrical conductivity, A represents a working surface area of the electrode, ΔU represents an overvoltage, and $v_1$ and $v_2$ are virtual manipulated variables, $v_1$ corresponding to a control variable of the spacing of the electrode from the surface to be machined and $v_2$ corresponding to a control variable of a current strength.

2. The method of claim 1, wherein the starting phase or the transient phase comparable to a starting phase is identified in that an ablation rate is not constant.

3. The method of claim 1, wherein the starting phase or the transient phase comparable to a starting phase is identified in that a maximum or average current strength per pulse rises over a series of successive pulses or the maximum or average voltage per pulse drops over a series of successive pulses.

4. The method of claim 1, wherein a current strength of a current pulse is ascertained at a predetermined point in time of the current pulse.

5. The method of claim 4, wherein the current strength of a current pulse is ascertained in a time interval in a middle of the current pulse.

6. The method of claim 4, wherein the current strength of each current pulse is ascertained.

7. The method of claim 5, wherein the current strength of each current pulse is ascertained.

8. The method of claim 1, wherein current strengths of the current pulses are ascertained at different applied voltages.

9. The method of claim 1, wherein material-specific and/or system-specific parameters are ascertained from registered data of the current pulses.

10. The method of claim 9, wherein the material-specific and/or system-specific parameters comprise at least one of an overall electrical resistance of a system, an overvoltage, or a conductivity.

11. The method of claim 10, wherein the material-specific and/or system-specific parameters comprise at least the overall electrical resistance of the system.

12. The method of claim 10, wherein the material-specific and/or system-specific parameters comprise at least the overvoltage.

13. The method of claim 10, wherein the material-specific and/or system-specific parameters comprise at least the conductivity.

14. The method of claim 1, wherein the regulation uses a PI regulator.

15. The method of claim 1, wherein the regulation uses a Kalman filter.

16. The method of claim 1, wherein the applied potential U is defined by $$U = v_2\left(R + \frac{x}{\kappa A}\right) + \Delta U.$$

17. The method of claim 1, wherein the feed V is defined by $$V = \kappa v_2 - v_1,$$

* * * * *